United States Patent [19]

Oosterling et al.

[11] 4,193,251
[45] Mar. 18, 1980

[54] BALING DEVICE FOR AGRICULTURAL CROPS

[75] Inventors: Pieter A. Oosterling, Nieuw-Vennep; Adriaan van Zweeden, Rijsenhout, both of Netherlands

[73] Assignee: Expert N.V., Curaçao, Netherlands Antilles

[21] Appl. No.: 848,526

[22] Filed: Nov. 4, 1977

[30] Foreign Application Priority Data

Nov. 5, 1976 [NL] Netherlands .......................... 7612345
May 13, 1977 [NL] Netherlands .......................... 7705351

[51] Int. Cl.² ............................................. A01D 39/00
[52] U.S. Cl. ........................................................ 56/341
[58] Field of Search ........................... 56/341, 343–364; 100/190, 188, 189

[56] References Cited

U.S. PATENT DOCUMENTS

| 375,078 | 12/1887 | Livergood | 100/190 |
|---|---|---|---|
| 1,100,592 | 6/1914 | Madden | 100/190 |
| 1,446,337 | 2/1923 | Dimech | 56/341 |
| 2,552,888 | 5/1951 | Druetta | 56/341 |
| 2,775,930 | 1/1957 | Anderson et al. | 56/341 |
| 3,815,344 | 6/1974 | Kucera | 56/341 |

Primary Examiner—Jay N. Eskovitz
Attorney, Agent, or Firm—John P. Snyder

[57] ABSTRACT

A mobile baler includes a horizontal baling chamber having a lateral collection chamber discharging thereinto. A ram moves back and forth across the discharge mount of the collection chamber and a closure member, controlling transfer of material from the collection chamber to the baling chamber, moves in concert with the ram. The baling chamber is normally closed at one end by a movable end wall and the drive means for the ram connects this end wall with the ram so that the end wall is held in closed position as the ram compresses material between it and the end wall.

4 Claims, 6 Drawing Figures

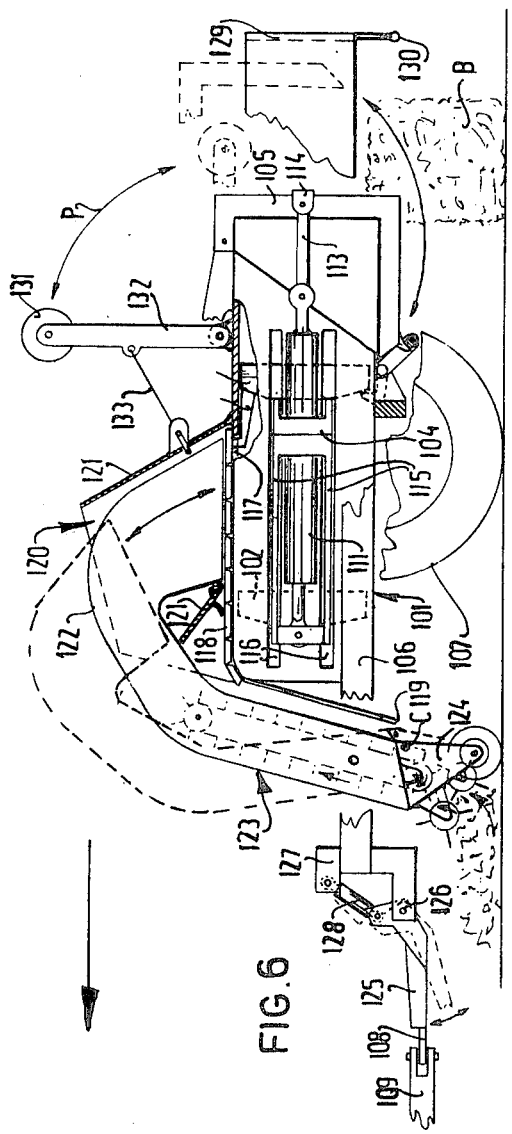

BALING DEVICE FOR AGRICULTURAL CROPS

The invention relates to a device for baling agricultural crop comprising a compression chamber and a driven ram adapted to reciprocate therein.

The invention has for its object to provide a baling device which is particularly suitable for producing bales having a high specific weight, which means that large quantities of agricultural crop are compressed into comparatively small bales.

In order to limit the dimensions of length of the compression chamber the invention proposes to provide a crop inlet port in a longitudinal wall of the compression chamber that can be closed and to establish a communication between a collecting chamber adjacent the compression chamber and the compression space through said port. With this disposition the stroke of the ram can be limited, since each time a quantity of crop is passed from the collecting chamber sideways into the compression chamber and subsequently compressed, which cycle of operations can be repeated several times. By coupling an element shutting the inlet port, in accordance with the invention, with the movement of the ram continuous operation is ensured.

An undisturbed passage from the collecting chamber to the compression chamber is obtained by providing equal circumferences for the inlet port and the collecting chamber.

In order to obtain a disturbance-free run of the ram it is advantageous to provide internal steps of the collecting-chamber wall facing the delivery port at a given height above the inlet port. If an excessive quantity of crop were present in the collecting chamber, this stepped structure will prevent accumulation near the rear edge of the inlet port, which accumulation would bring about an abrupt heavy load on the ram.

According to the invention the device may have a mobile structure and be provided with an elevator joining the collecting chamber and being, moreover, capable of cooperating with a pick-up mechanism for lifting the crop from the ground.

Further the object of the invention is to subject the crop fed into the collecting space to a given amount of densification so that after the introduction into the baling chamber proper the pre-densified crop can be compressed to a bale of high degree of densification by fewer runs of the ram.

According to the invention this is achieved by a collecting space formed by a stationary portion and a roof portion freely movable within walls of the former.

Owing to the free up and downward movement of the roof portion the crop contained in the auxiliary space is predensified by the weight of the roof portion. Moreover, the crop can be fed without disturbance into the collecting space, since the roof portion is urged upwards by the entering crop.

According to a further aspect of the invention the roof portion is linked to the elevator mechanism so that it is ensured that the crop is introduced into the collecting space on the lower side of the roof portion.

If the elevator mechanism comprises a closed channel accommodating an endless elevator belt, it is preferred in accordance with the invention for the roof portion to be integral with the closed channel of the elevator mechanism, which mechanism is pivotable about a horizontal shaft with respect to the baling chamber. As a result part of the weight of the elevator mechanism together with that of the roof portion will even more effectively densify the crop in the collecting space.

Further features and advantages of the invention will become apparent from the following description of some embodiments In the drawing FIG. 1 is a perspective view of the baling device embodying the invention, wall portions of the collecting chamber and compression chamber being broken away, FIGS. 2 and 3 two detailed elevational views of the locking and closing mechanism for the conveying member and the pivotable end portion of the compression chamber respectively, FIG. 4 shows a variant of a mobile baling device, FIG. 5 is a perspective view of a further drawn baling device, and FIG. 6 is a longitudinal sectional view of the device shown in FIG. 5.

DETAILED DESCRIPTION OF THE INVENTION

Figure 1:
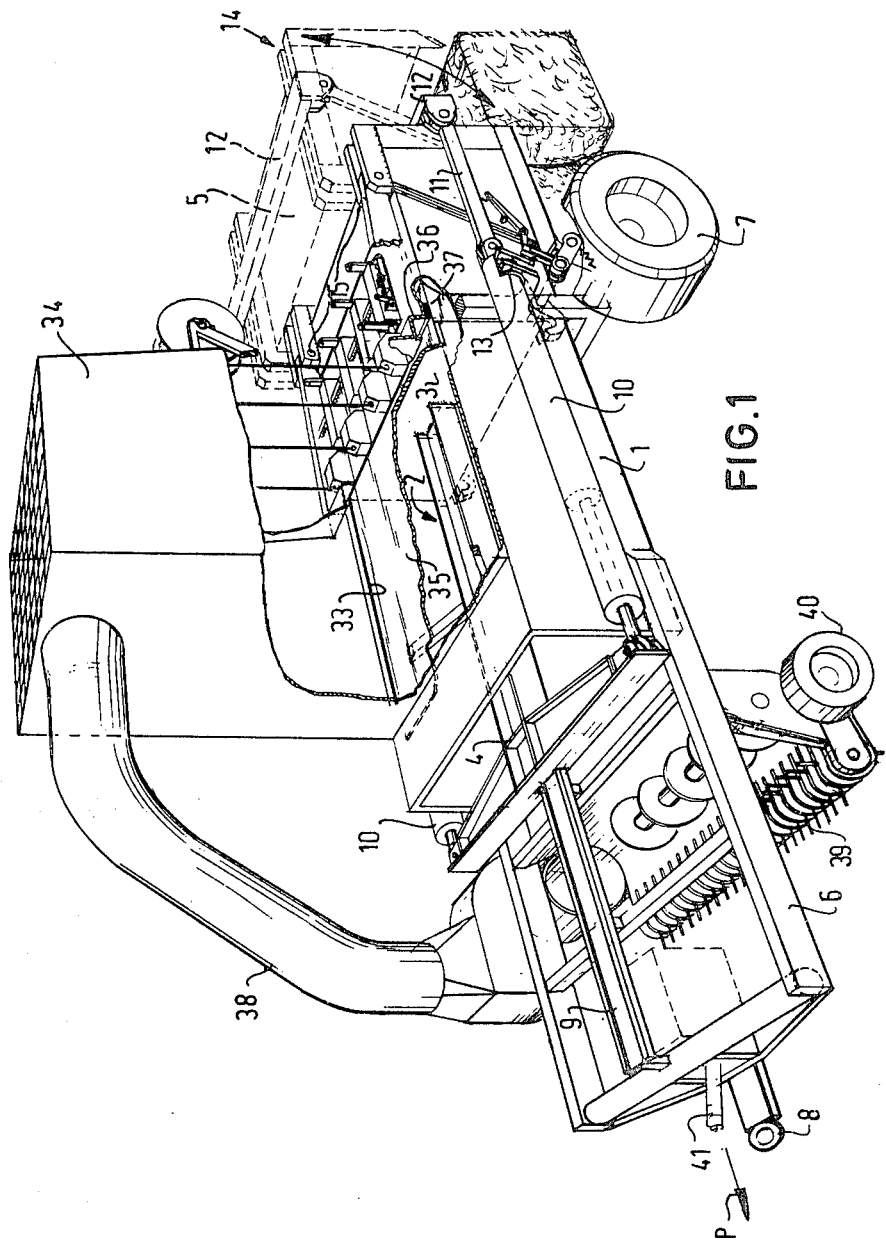

The mobile baler shown in FIGS. 1–4 mainly comprises a horizontal compression chamber 1, in which a ram 2 is adapted to reciprocate. The ram mainly comprises a pressing plate 3 corresponding to the cross-section of the compression chamber 1 and being fastened to the end of a T-shaped pressing body 4. The compression chamber 1 mainly comprises two longitudinal sidewalls, a top wall and a bottom wall interconnected at the right-hand top end in FIG. 1 by a closed end wall 5.

The pressing chamber 1 is supported by a frame 6 bearing at the rear end on a set of ground-engaging wheels 7. At the front end the frame 6 is provided with a draw ring 8 for attachment to, for example, an agricultural tractor. The frame furthermore holds a guide path 9 extending in the direction of length, on which the pressing body 4 of the ram 2 is slidably supported.

According to one aspect of the invention the driving gear for the ram 2 is arranged outside the compression chamber 1, that is to say in the embodiment shown, between the ends of the top part of the T-shaped pressing body 4 and the end wall 5. The driving gear comprises in this case two hydraulic cylinders 10, disposed one on each side of the compression chamber 1, the piston rods of which are fastened to the pressing body 4, whereas the other end of the cylinder is pivoted through a coupling rod 11 to a stiffening beam 12 associated with the end wall 5. Near the coupling rod 11 the cylinder 10 is supported by a seat 13 fastened to the sidewall of the compression chamber 1.

The end wall 5 of the compression chamber 1 forms part of a pivotable end portion 14, which is coupled in this case with the compression chamber 1 so as to be upwardly pivotable about two hinges 15. The end portion furthermore comprises a part of the sidewalls and bottom and top walls respectively at right angles to the end wall 5.

Figure 2:
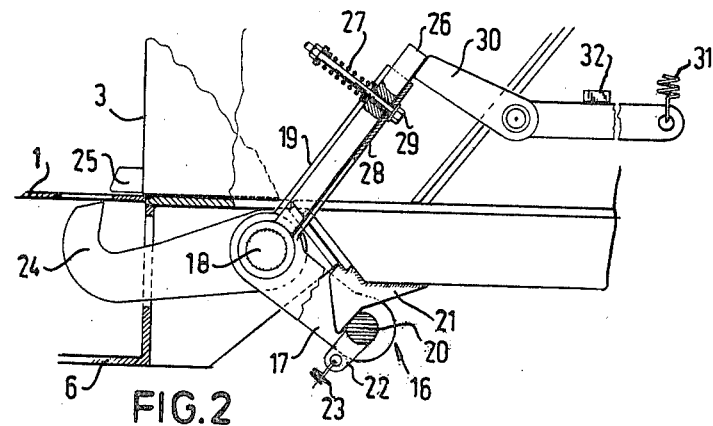
Figure 3:
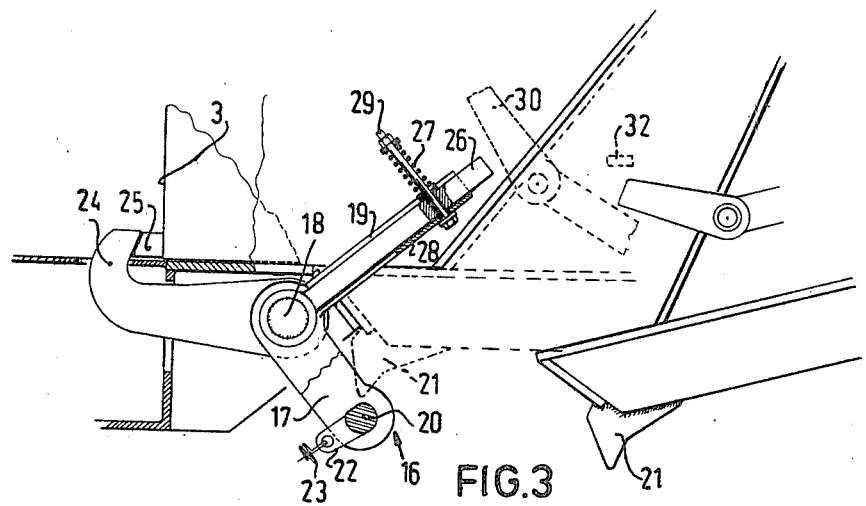

The end portion 14 can be locked in the closed position by means of the locking means 16 shown in detail in FIGS. 2 and 3. Said locking means are formed by one or more brackets 17 adapted to turn about a common shaft 18 and to be turned by means of a lever 19 fastened at an angle to the bracket 17. At the end remote from the shaft 18 the brackets 17 have a pin 20 co-operating with a lug 21 fastened to the pivotable portion 14. The bracket 17 is biassed by means of an eyelet 22 fastened to the pin 20 and a spring 23 coupled herewith in clockwise direction as indicated in FIGS. 2 and 3.

About the same common shaft 18 are pivotable lock bolts 24, which co-operate with a lug 25 on the rear side of the pressing plate 3. These lock bolts serve to lock the ram 2 in the pressing state, the function of which will be explained more fully hereinafter. The pressing state of the ram 2 is illustrated in FIG. 1 as well as in FIGS. 2 and 3. The lock bolt 24 is turned by means of a control-lever 26 extending parallel to the control-lever 19 of the bracket 17. The lever 26 is urged by a compression spring 27 against a stop 28 fastened to the lever 19 because the other end of the spring 27 bears on a nut screwed onto a bolt 29, the head of which is in engagement with the stop 28. The lever 26 is guarded by a locking pawl 30, which is pivoted to the pivotable end portion 14 of the compression chamber and being actuable by means of suitable control-members 31. The control-members 31 are formed in this case by a biassing spring urging the pawl 30 against a fixed stop 32.

The top wall of the compression chamber 1 has a port 33, the circumference of which corresponds with the circumference of a collecting chamber 34 arranged on the compression chamber 1. The inlet port 33 can be closed by an element 35, which is connected with the pressing plate 3.

The wall of the collecting chamber 34 facing the end wall 5 or the pivotable end portion 14 has a stepped structure just above the inlet port 33, the steps projecting inwardly (see reference numeral 36). At the transition between the front wall and the top wall of the compression chamber 1 a cutter 37 co-operates with the top edge of the pressing plate 3 for cutting long stems of crop to be compressed.

The collecting chamber 34 is fed by an elevating mechanism 38 receiving the crop from a pick-up mechanism 39 of known construction. The pick-up mechanism is independent in a vertical sense with respect to the frame 6 by means of the wheels 40.

The actuation of the various rotatable and movable elements is obtained in this embodiment from the power take-off shaft 41 of the tractor at the front of the frame 6.

The device operates as follows. The device is run in the direction of the arrow P across the field, the pick-up mechanism 39 raking up the mown crop, for example, grass and conveying it via the worm conveyor to the elevator mechanism 38, from which the crop is fed into the collecting chamber 34. In the starting position the ram is completely slid out of the compression chamber 1 so that the pressing body 4 is located at the left-hand bottom end of the guide 9. The inlet port 33 is released because the locking element 35 is displaced to the left with the pressing plate 3. Thus the crop enters the compression chamber 1. After a given time the cylinder 10 on either side of the compression chamber 1 is energized so that the ram 2 moves to the rear and compresses the crop in the compression chamber 1. During this movement the element 35 will shut the inlet port. Excessively long tailings are cut off by the cutter 37 and the pressing plate 3. The step structure 36 prevents accumulation of crop so that cutting can be performed without requiring much energy. Feeding and compressing of the crop may take place in a few cycles until a sufficient quantity of crop for a desired bale is received in the rear part of the compression chamber 1.

During the compression the pivotable end portion 14 is closed, that is to say, the closing mechanism 16 occupies the position illustrated in FIG. 2.

When a sufficient quantity of crop is compressed into a bale and when this bale is fixed by binding means of some kind, the pawl 30 can be lifted by turning it in clockwise direction (FIG. 2), so that it gets into the position indicated by dots in FIG. 3. The bracket 17 will instantly be turned by the spring 23 in clockwise direction, the lug 21 being thus released. The control-lever 19 will catch the lever 26 owing to the bias pressure of the spring 27. Thus the lock bolt 24 turns in clockwise direction and will hook behind the lug 25 of the pressing plate 3. Then the pivotable end portion 14 is unlocked and the pressing plate 3 or the ram 2 is locked. By energizing the cylinders 10 in the reverse sense, the cylinder 10 will move to the right in FIG. 1 owing to the locked state of the piston with respect to the compression chamber 1 so that the pivotable end portion 14 will turn upwardly about the hinges 15, which is enabled by the hinge portion 11 between the cylinder 10 and the supporting beam 12. The reactive force in a vertical sense on the cylinder 10 is absorbed by the seat 13.

After the ready bale has dropped out of the compression chamber 1, the actuation of the cylinder 10 is reversed, the portion 14 swings back, the pawl 30 butts against the lever 26 so that the lock bolt 24 turns back and unlocks the ram 2 and the bracket 17 also turns back into the locking position. At the approach of the lug 21 the bracket 17 can yield against the force of the spring 27 until the pin 20 snaps behind the lug 21. The device is then ready for the next pressing run.

Figure 4:
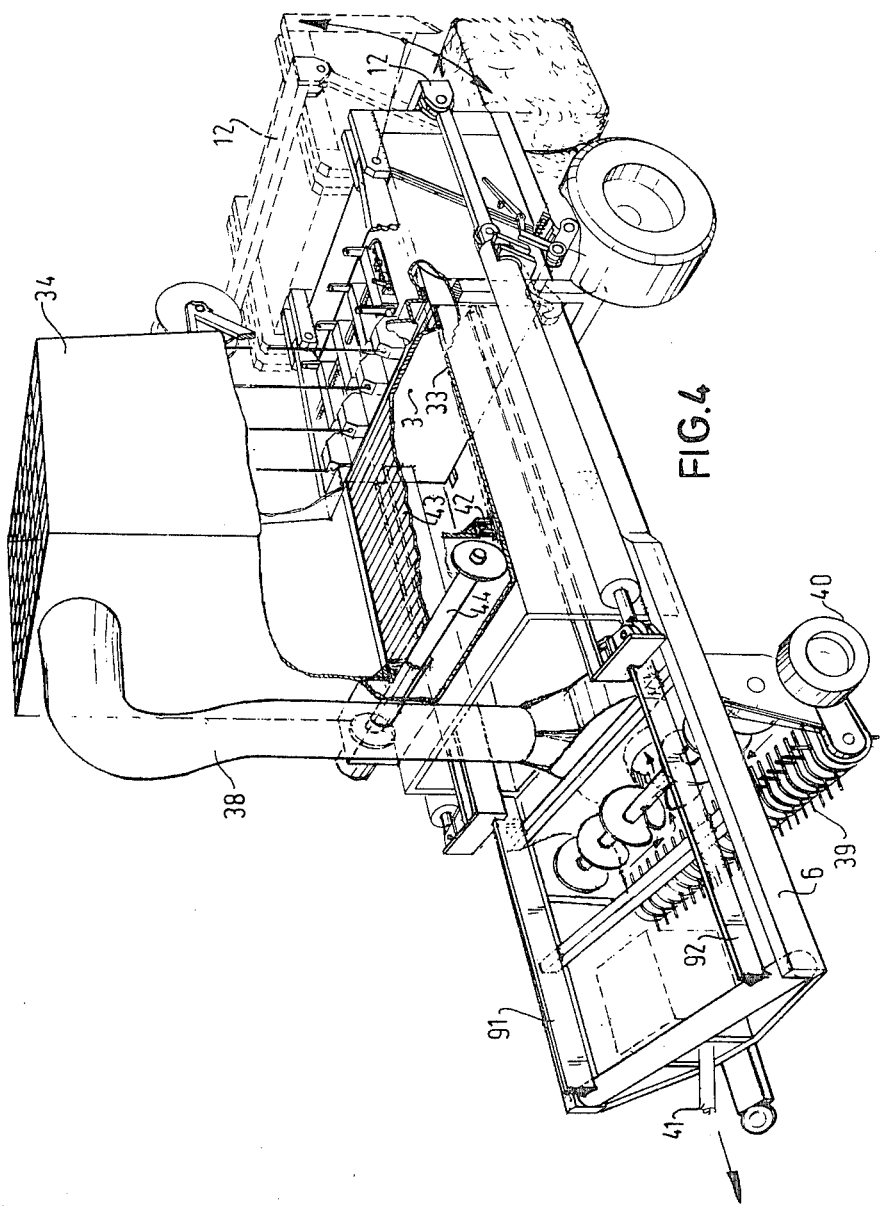

FIG. 4 shows an alternative embodiment of the baling device, which is distinguished from the embodiment shown in FIG. 1 by a centrally arranged elevator mechanism 38. This central disposition is enabled by splitting up the guide path 9 of the ram 2 into two rails 91 and 92. In this embodiment the worm conveyor of the elevator mechanism is formed by two portions having opposite pitches.

A further difference resides in that the closing element of the inlet port 33 is formed herein by a flexible mat 43. The mat is wound up around a spindle 44 as soon as the ram 2 moves to the right. A brush 42 on the mat 43 serves for keeping the top side of the coil clean so that winding will not be disturbed.

Figure 5:
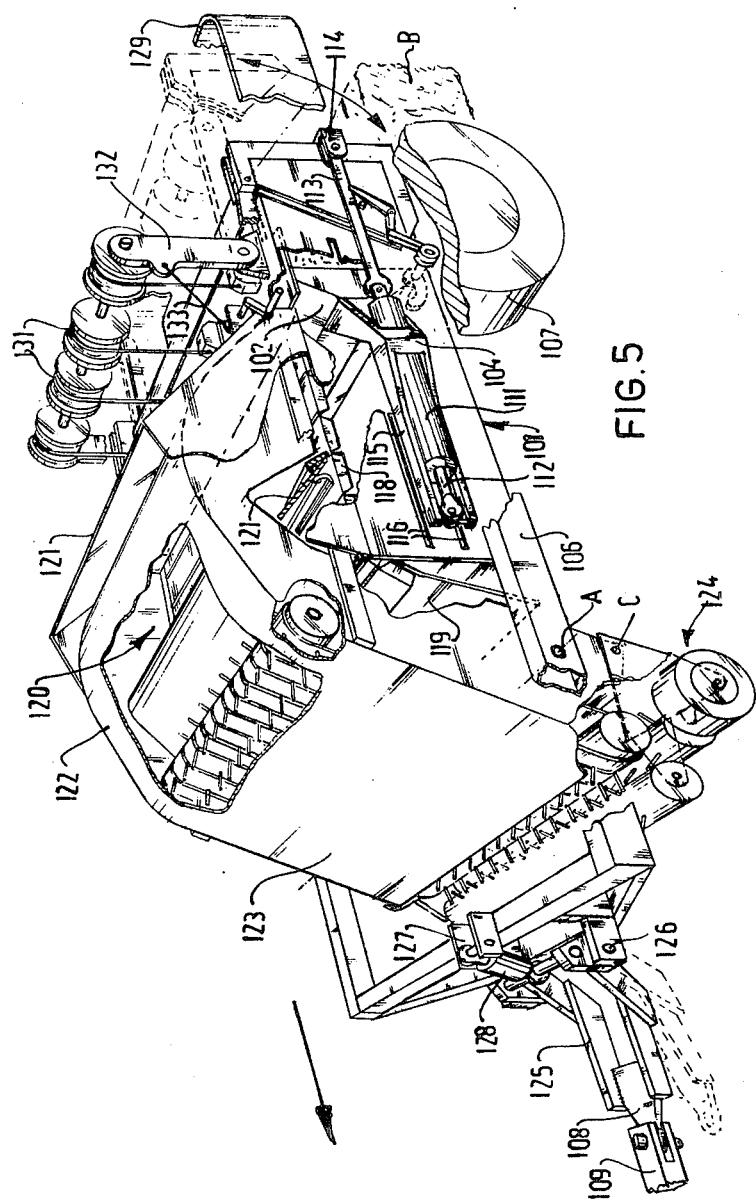

The mobile baler shown in FIGS. 5 and 6 mainly comprises a horizontal baling chamber 101, in which a ram 102 is adapted to reciprocate. The ram 102 mainly comprises a pressing plate 103 corresponding to the cross-section of the compression chamber 101 and being provided on either side with a pressing body 104 passed through the sidewalls of the baling chamber 101. Apart from said sidewalls the baling chamber 101 comprises a top wall and a bottom wall interconnected at the right-hand top end in FIG. 5 by a closed, upwardly pivotable end wall 105.

The baling chamber 101 is supported by a frame 106, which is supported at the rear end by a set of ground-engaging wheels 107. At the front the frame 106 is provided with a draw ring 108 for establishing a connection with, for example, an agricultural tractor. Only the drawbar 109 of this agricultural tractor is shown.

In the embodiment shown the ram 102 is driven by two cylinders 111 extending outside the baling chamber 101 along the sidewalls thereof, the piston rods 112 of said cylinders acting upon the free ends of the pressing bodies 104, whereas the closed end wall of the cylinder is connected through a coupling rod 113 with a bracket 114 around the closed end wall. From the Figures it will be apparent that the cylinder 111 is arranged between two parallel elements 115 of a pressing body, said elements 115 being slidable in a reciprocatory manner in slots 116 provided in the sidewall of the baling chamber 101. The Figures show the ram 102 in the extreme terminal position or compressing state so that upon energization of the cylinder 111 the ram is moved forwardly, viewed in the direction of travel, into the position indicated by broken lines on the left-hand side of FIG. 6. During this movement the ram 102 passes along an inlet port 117 provided in the upper part of the baling chamber, which port can each time be closed by a screen 118 coupled with the pressing plate 103. When the ram is withdrawn, the screen slides together with the pressing plate along a guide 119 (see FIG. 6).

Above the baling chamber is arranged an auxiliary space 120, which comprises two portions according to one aspect of the invention. The first fixed portion formed by upright sidewalls 121 gives access to the inlet port 117 of the baling chamber 101. The second portion 122 of the auxiliary space 120 closes the fixed portion on the top side and is freely slidable up and down in the space bounded by the sidewalls 121 of the fixed portion of the auxiliary chamber 120.

In the embodiment shown the freely movable portion 122 of the auxiliary space 120 is integral with a chamber 123 of an elevator which receives the crop from a pick-up device 124 of known type and passes it onto the auxiliary space 120 on top of the baling chamber 101. In the embodiment shown the free movement of the roof portion 122 of the auxiliary space 120 is enabled by the pivotability of the unit formed by the elevator and the roof portion 122 about a horizontal shaft indicated in FIG. 6 by A.

It will be obvious that the crop fed into the auxiliary space 120 by the conveyor 123 is subjected to a pre-densification by the weight of the elevator and of the roof portion 122, while the crop can be continuously fed in since the roof portion 122 is pushed upwards by the incoming crop. After the withdrawal of the ram 102 and the resultant release of the inlet port 117 of the baling chamber 101, the pre-densified crop will enter the baling chamber 101 in front of the pressing plate. During the next pressing cycle the pre-densified crop is pushed to the right in the baling chamber and thus further densified. During this compression run the port 117 is closed by the screen 118, after which the auxiliary space 120 is again filled with fresh crop.

A smooth delivery of the crop from the auxiliary space 120 is ensured by the upright walls 121 diverging in the direction towards the port 117.

In order to obtain the correct position of the baling device, the frame 106 is provided at the front with a vertically adjustable draw ring 108. To this end the draw ring is secured to a part 125 pivotable about a shaft 126. Moreover, between the part 125 and a support 127 secured to the frame there is mounted a cylinder 128, upon energization of which the part 125 and hence the draw ring 108 can be shifted from the position indicated by solid lines into the position indicated by broken lines in FIG. 6. It will be apparent that when the draw ring is coupled with the drawbar 109, the frame is urged upwards at the front when the draw ring 108 is moved into the position indicated by broken lines, as a result of which the pick-up device 124 is released from the ground. In this way the pick-up device 124 can be adjusted to a given level above the ground and, in addition, the assembly can thus be moved into a position suitable for road transport.

The baling device defined and illustrated is intended to make bales larger than the normal size of straw bales and having a degree of density such that high overall weights are obtained. In order to safeguard the device and to protect the operators a safety bracket 129 is arranged around the tiltable rear wall of the baling chamber 101. According to a further aspect the invention proposes to equip said bracket with a feeler 130 detecting whether a bale B pushed out of the baling chamber has passed beyond the bracket 129 after a further transport of the device. The feeler 130 generates a signal which serves on the one hand to warn the tractor driver and on the other hand to function in the overall programming of the baling device. If the baler not yet at a distance from the bale B such that the feeler 130 generates a signal, re-closure of the tilted-up rear wall is automatically prevented.

If the baling device is equipped with a binding member for wrapping the bales formed in the baling chamber 101, it is common practice to suspend reels of twine in an auxiliary frame to the device. It will be obvious that the formation of such large and heavy bales requires a correspondingly heavy binding agent, the overall weight of the reels being thus increased. In order to facilitate the control of the device the invention proposes to arrange the auxiliary frame carrying the reels so as to be pivotable with respect to the entire device so that the operator can easily suspend the reels in the auxiliary frame, which can then be turned back into the most effective working position for the binding member. In the embodiment shown the auxiliary frame comprises two posts 132, the lower ends of which are pivoted to the top wall of the baling chamber 101. An appropriate winch mechanism 133 permits of turning the auxiliary frame 132 in the direction of the arrow B so that the reels can be mounted in the position indicated by broken lines. The position indicated by solid lines is the most effective working position for the binding member.

Other embodiments are possible within the scope of this invention. For example, the movable roof portion 122 of the auxiliary space 120 may be mounted so as to be out of engagement with the elevator 123, in which case the crop can be introduced through a port in the front wall 121 of the space 120.

Further one or more side walls of the auxiliary space 120 may be mounted pivotably to the compression chamber 101. Such a pivotable wall could be front wall 21, which can be adapted to rest loosely upon the movable roof portion 122.

The draw ring 108 may be secured to an auxiliary frame, which is vertically displaceable along the main frame 106.

The auxiliary frame 132 of the reels 131 need not be pivotable about a horizontal axis, it may be constructed so that the reels can swing around a vertical axis so that they can be turned beyond the side of the baling chamber 101.

In order to match unevennesses of the ground the pick-up device 124 may be coupled with the elevator 123 so as to be pivotable about a horizontal shaft C. There is provided a stop for holding the pick-up device free of the ground in the transport position, in which the frame 106 is moved upwards.

As a matter of course, the invention is not limited to the embodiments described above.

What is claimed is:

1. In a baling device, the combination of:

a mobile frame having supporting wheels;

a generally horizontal baling chamber on said frame having a movable end wall against which material is to be compressed;

a collection chamber disposed laterally of said baling chamber and having a discharge mouth communicating therewith in spaced relation to said end wall whereby said baling chamber defines a compression space beyond said discharge mouth toward said end wall;

a ram dimensioned to fill the cross section of the baling chamber and reciprocable therein between a retracted position clearing said discharge mouth on that side thereof remote from said end wall and in extended position beyond said discharge mouth and adjacent said end wall;

drive means connecting said ram with said end wall whereby said end wall is subjected to closing force when said ram is moved toward its extended position to compress material between said ram and said end wall;

means for continuously feeding material to be compressed into said collection chamber in response to movement of said frame over the ground;

a closure member normally blocking said discharge mouth; and means for moving said closure member in concert with said ram whereby said closure member is moved from its normal, blocking position as said ram is moved toward its retracted position and is returned to its normal position as said ram is moved toward its extended position.

2. In a baling device as defined in claim 1 wherein said collection chamber is disposed above said baling chamber, said collection chamber comprising upstanding side walls defining said discharge mouth at their lower edges, and said means for feeding comprising an elevator discharging into said collection chamber.

3. In a baling device as defined in claim 2 wherein said elevator includes a discharge end portion vertically movable within said collection chamber and defining a roof therefor, said elevator being pivotally mounted on said frame to allow said roof to rise and fall within said collection chamber.

4. In a baling device as defined in claim 2 wherein that side wall of the collection chamber closest to and parallel with said end wall is stepped forwardly to increase the area of said discharge mouth at said baling chamber.

* * * * *